United States Patent [19]

Pickard

[11] Patent Number: 4,574,710

[45] Date of Patent: Mar. 11, 1986

[54] TURBO BURNER COAL POWERED TURBINE ENERGY SYSTEM

[76] Inventor: John D. Pickard, 9802 Longwood Cir., Louisville, Ky. 40223

[21] Appl. No.: 675,012

[22] Filed: Nov. 26, 1984

[51] Int. Cl.[4] ............................................. F23B 7/00
[52] U.S. Cl. .................................. 110/234; 110/110; 110/171; 110/190; 110/223; 110/244; 110/254; 110/259; 110/303; 236/15 E
[58] Field of Search ................ 110/101 CC, 102, 110, 110/128, 165 A, 171, 188, 190, 211, 212, 215, 216, 218, 223, 231, 234, 244, 247, 254, 259, 265, 266, 286, 293, 300, 303; 236/14, 15 BD, 15 E

[56] References Cited

U.S. PATENT DOCUMENTS

| | | | |
|---|---|---|---|
| 2,215,067 | 9/1940 | Denison et al. | 110/286 X |
| 2,560,074 | 7/1951 | Bloomer | 110/286 X |
| 2,932,712 | 4/1960 | Levin | 110/110 |
| 2,932,713 | 4/1960 | Powers | 110/110 |
| 3,744,438 | 7/1973 | Southwick | 110/259 X |
| 3,754,869 | 8/1973 | Van Raden | 110/210 X |
| 3,862,608 | 1/1975 | Lagen | 110/259 X |
| 4,206,713 | 6/1980 | Ryason | 110/218 X |
| 4,385,566 | 5/1983 | Harris | 110/110 |
| 4,414,906 | 11/1983 | Hartouni | 110/102 X |
| 4,483,257 | 11/1984 | den Otter | 110/218 |

Primary Examiner—Edward G. Favors
Assistant Examiner—Steven E. Warner
Attorney, Agent, or Firm—Edward M. Steutermann

[57] ABSTRACT

A combustion system to utilize particulate fuel where the fuel is compressed and extruded into a selected shape to be burned in a combustion chamber under conditions where particles of burning material are maintained in the combustion chamber until the weight of the particulate material decreases to the point where the particle is carried from the chamber through a heat exchanger by combustion gasses to a scrubber section for removal of impurities such as $SO_2$ and $NO_x$.

12 Claims, 6 Drawing Figures

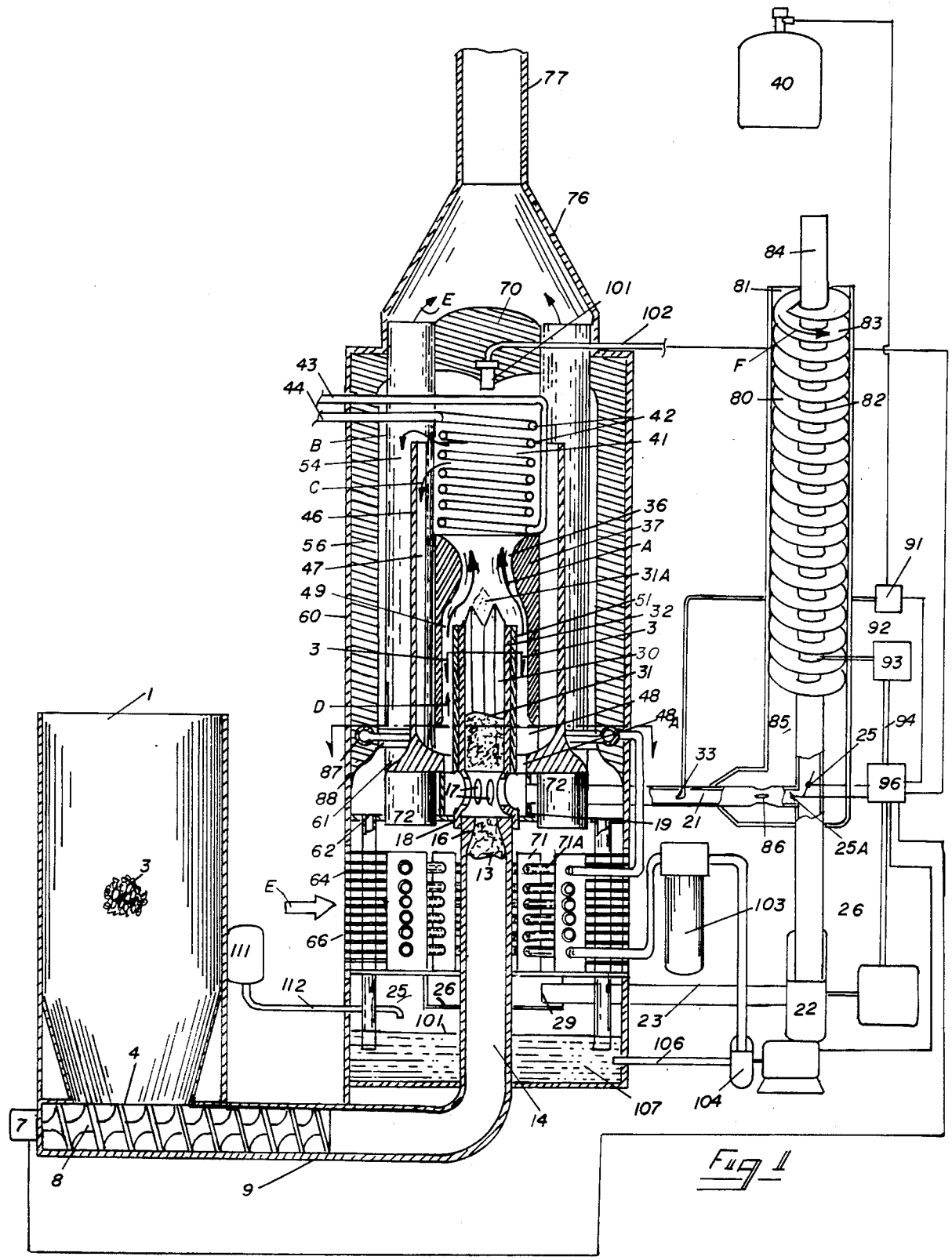

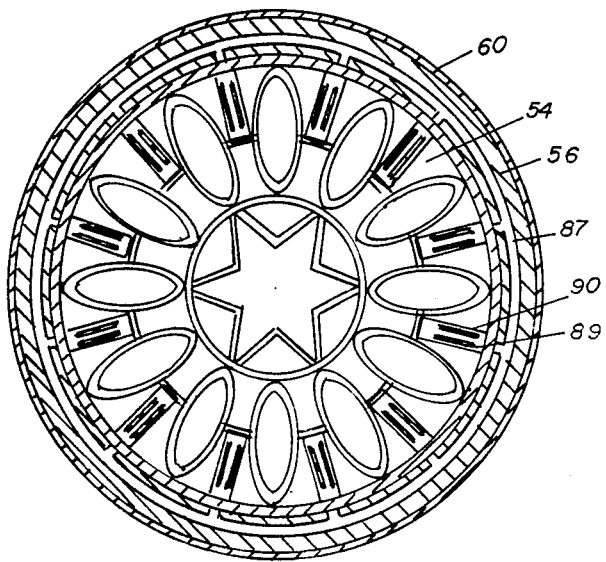
Fig 3
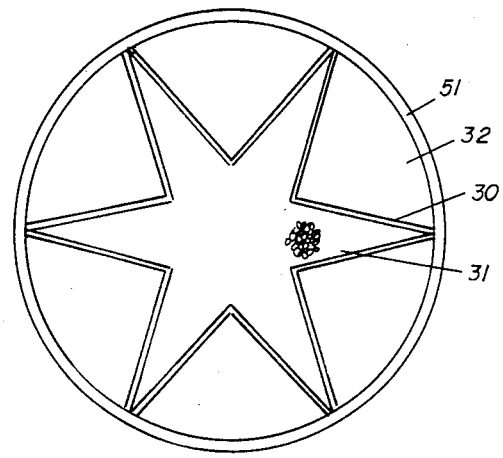
Fig 2
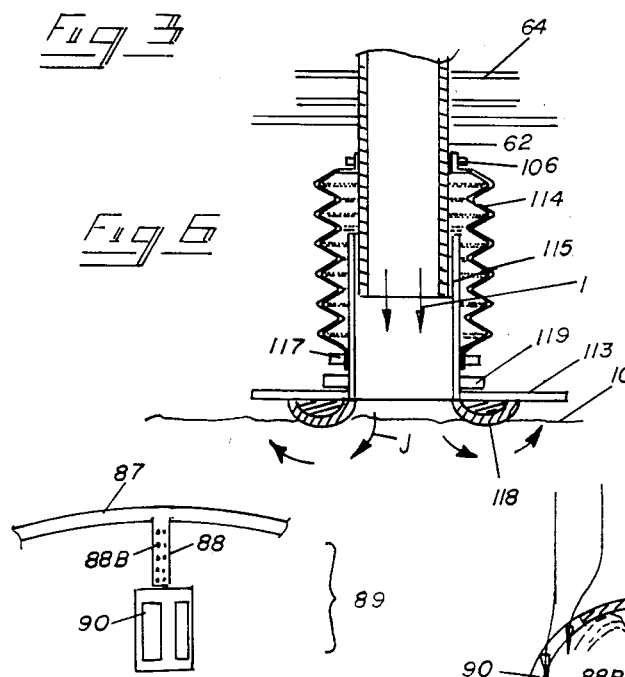
Fig 6
Fig 4
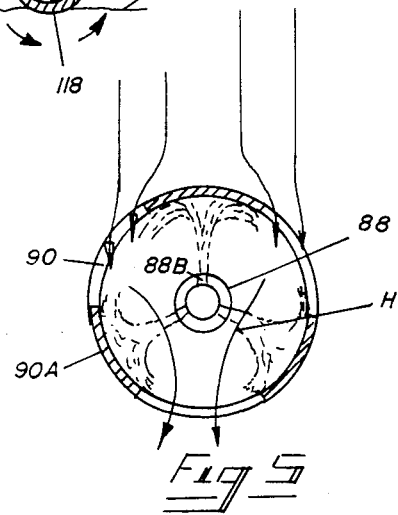
Fig 5

TURBO BURNER COAL POWERED TURBINE ENERGY SYSTEM

BACKGROUND OF THE INVENTION

The present invention relates to combustion devices and more particularly to combustion devices utilized to burn coal, or sawdust, or combinations of the materials. The fuel material is feed from a hopper to be extruded prior to feeding to a combustion chamber.

Prior art devices for the combustion of particulate matter, and particularly for the combustion of coal have in general contributed to the increase in atmospheric Sulfur Dioxide ($SO_2$) and Nitrous Oxides, particularly Nitrogen Oxides ($NO_x$). Estimates have been made that in 1980, 19 million tons of Nitrous Oxides were released into the air in the United States and there is a projected increase of 35% in such pollutants by the year 2000.

While prior art arrangements are known for the burning of particulate fuels, no prior art arrangement is known to comprehend the features of the present invention.

Prior art examples of a process for the extrusion of coal for use as a fuel is illustrated in U.S. Pat. No. 4,206,713 which features extruder arrangement where coal is extruded both by mechanical heat of extrusion and by additional heat provided in the device so the extrusion process provides a coal product which can be immediately combusted in a suitable combustion chamber. The coal may be premixed with other materials such as desulfuration aid or metal ores.

U.S. Pat. No. 2,228,751 teaches a stoker arrangement where a combination of wood shavings and coal are supplied to a combustion chamber of a heating device. U.S. Pat. No. 4,414,906 teaches a burner casing with a vertical support sleeve forming a combustion chamber with an annular heat exchange area around the sleeve where fuel is placed within the sleeve and burned.

U.S. Pat. No. 2,932,712 and 2,932,713 teach incinerator devices utilizing an auger type feeder to supply waste material to a combustion chamber where various heat exchange arrangements are provided.

No prior art arrangement is known which can be utilized on a small scale to efficiently provide energy, heating and simultaneous co-generation of electrical energy. In accordance with the present invention it is recognized that numerous high efficiency multi-fuel burning co-generation systems could be utilized to simultaneously satisfy heating requirements and supplant a large portion of present generating systems.

No prior art arrangement is known utilizing a combined extruder and burner assembly of the type provided by the present invention for the production of energy and further to provide a device which is particularly useful in connection with the co-generation of electrical power and the simultaneous furnishing of heat where means are provided to significantly reduce the product produced in the arrangement and where the arrangement is significantly enhanced.

SUMMARY OF THE INVENTION

The present invention provides a new, useful, and inexpensive means for burning low cost fuel, which because of its unique configuration, significantly reduces atmospheric pollution resulting from burning of coal and further can be adapted to provide a waste material as a useful by-product, particularly from the combustion of coal.

More particularly, devices within the scope of the present invention provide a means for essentially complete combustion of coal, or coal/wood combinations, through the use of an unique combustion configuration utilizing changes in pressure and velocity of the combustion air stream to suspend and then carry off the products of combustion to a reservoir where impurities can be removed prior to emission of the air to the atmosphere. Additionally, the combustion system within the scope of the present invention makes further use of the heat generated during the course of the combustion by preheating combustion air supplied to the device to further enhance the combustion efficiency of the arrangement.

The present invention provides a combustion system to utilize particulate fuel where the fuel is compressed and extruded into a selected shape to be burned in a combustion chamber under conditions where particles of burning material are maintained in the combustion chamber until the weight of the particulate material decreases to the point where the particle is carried from the chamber through a heat exchanger by combustion gasses to a scrubber section for removal of impurities such as $SO_x$ and $NO_x$.

While various arrangements within the scope of the present invention will occur to those skilled in the art upon reading the disclosure set forth hereinafter, it is understood that the description given herein, with reference to the accompanying drawings, is by way of example only and not by way of limitation.

BRIEF DESCRIPTION OF THE DRAWINGS

One example within the scope of the present invention is illustrated in the accompanying drawings wherein:

FIG. 1 is an overall, cut away, view of an example of an arrangement within the scope of the present invention;

FIG. 2 is a view taken along a plane passing through line 2—2 of FIG. 1;

FIG. 3 is a view taken along a plane passing through line 4—4 of FIG. 1;

FIG. 4 is a view taken along a plane passing through line 4—4 of FIG. 1;

FIG. 5 is a schematic illustration of a separator arrangement within the scope of the present invention utilized in the example shown in FIG. 1; and FIG. 6 is a sectional view of one arrangement of a gas conduit useful in arrangements in accordance with the present invention.

DETAILED DESCRIPTION OF THE DRAWINGS

Referring to FIG. 1 which is a cutaway view of one arrangement within the scope of the present invention, a hopper 1 is provided to receive particulate matter 3, for example coal or coal/wood particles, to be utilized as combustion material in the operation of the device describe hereinafter.

Inclined walls 2 are provided as known in the art to define an outlet 4 to an auger 6 carried by a shaft 8 driven by a motor 7. As known in the art, auger 6 is located in a shell 9 and acts to compress the materials 3 received from the hopper 1 into a solid mass of material. The compressed material 13 is shown moving up a vertical run 14 from the auger shell 9.

An extruder die 16 is located at the end of the vertical section 14 so the shell extrudes a more compressed section 31 of fuel through a star shaped die 30. With reference to FIG. 2, die 30 is shown contained within a sleeve 51 described hereinafter to define combustion air passages 32 as also described hereinafter.

As is known in the art, it is possible by the heat generated by extrusion to heat coal particles to the point where they become molten, viscous and tar-like. While such an operating procedure can be utilized in some devices within the scope of the present invention, and in accordance with one feature of the present invention, it has been found advantageous to compress the materials to a point where they form a solid mass but where they do not become viscous.

As shown vertical run 14 of the shell terminates at die 16 through which the material is forced. A ring 18 is provided at the end of die 16 where the fuel passes through the ring, which includes air inlet openings 17 to receive air from a plenum chamber 19 communicating with an air inlet conduit 21 which provides heated induced draft combustion air from an inlet 81 of a plenum 80 which surrounds a combustion air exhaust 84 which is provided with a helical heat exchange surface 82 to heat the makeup combustion air, indicated by arrow F. The makeup combustion air flows in a helical path to be heated and then to a plenum section 85 where it is introduced through a venturi 86 to conduit 21. A blower 22 is provided to receive combustion air from an inlet 23 which communicates with a plenum 24 defined by a baffle 26 in a chamber 25 which prevents liquid, as described hereinafter, from being admitted to the inlet of conduit 23. A damper 25 is provided at the outlet 26 from blower 22, to divert a selected portion of air through venturi 86 to proportion flow of makeup air and recycle combustion air in response to operating conditions as discussed hereinafter, and supply the air to plenum chamber 19.

In addition, as described hereinafter for purposes of start-up, a source of combustible fuel such as natural gas 40 can be provided having a conduit 40A which supplies the fuel through an outlet 33 in conduit 21 to supply a combustible mixture to the plenum 19 for admission through apertures 17 to initiate burning during start-up procedures and through annular conduit 48A to flow upwardly to support combustion of solid fuel as described hereinafter. In the combustion assembly air passages 32, defined between die 30 and wall 51 communicates with inlets 17 to provide combustion air for fuel rod 31 where the air flows through passages 32 around die 30 which defines rod 31 to prevent melting or softening of the fuel rod prior to burning in the combustion area. It has been found to be undesirable for the fuel to reach a softening temperature in this area, because it then fuses into a high viscosity tarry mass which is difficult to control and burn. The fuel rod 31 is urged upwardly through die 30 as shown, to an outlet 35 where combustion occurs with air from passage 32 as the rod 31 is emitted into a venturi throat 36 defined by sidewalls of a sleeve 37. Sleeve 37 can be made of a cast high alumina temperature resistant ceramic material with sufficient hardness to withstand erosion and heat of a continuously circulating hot gasses and erosive effect of a fluidized bed as described hereinafter. The combustion gasses from the burning fuel rod pass into a chamber 41 defined within a coil heat exchanger 42. Heat exchanger 42 has an inlet 43 and an outlet 44. The inlet 43 is supplied with water or low pressure steam and higher pressure steam is provided from the outlet 44 where the steam can be used for cogeneration of electrical energy in an appropriate device not shown.

Combustion gasses A flow upwardly as indicated by arrow A, through the venturi 36 so that the velocity of the gasses increases and the pressure decreases in the venturi throat to assist in drawing combustion air into the system from inlet conduit 21. At this point it must be recognized that the combustion products emitted from the fuel rod 31 include not only gasses but also particulate matter, and in many instances burning particulate matter. The characteristics and design factors of the device are selected so that the gasses and lighter particulate matter are emitted over a baffle 46, as shown by arrow B, to an annular plenum 54, while the heavy particulate matter falls, as shown by arrow C, into a plenum chamber 47 defined between the baffle 46 and the outer surface of the ceramic sleeve 37. The particulate matter then falls to the bottom opening 48 where it is carried upwardly as shown by arrow D, by the induced up draft intake air from the aperture 48A which admits air from plenum chamber 19, to an annular space 49 between the inner surface of the venturi section 37 and an insulating sleeve 51 provided around the sleeve 32. The insulating sleeve 51 is provided to further insulate the fuel rod 31 from the heat, in addition to the cooling provided by the gasses flowing upwardly through the passage 32 to prevent softening of the fuel rod as previously described. The gasses, represented by arrow B, which are emitted between openings of coil 42 and are light enough to flow upwardly over the upper edge of baffle 46 and flow downwardly through plenum chamber 54 between an outer wall 56 and the baffle 46 and thence through the gas scrubber nozzles 61 described hereinafter, to a conduit 62.

Conduits 72 shown in cross section in FIG. 3 are provided to receive air to be heated as discussed hereinafter and are heated by the gasses B which flow in between and along the outside surface of the conduits. It will be noted that the conduits 72 extend through baffle 46 so heat is also transferred to the conduits by the gasses C. Conduit 62 carries fins 64 to transfer heat from the scrubber liquid and the gasses to the fins. Inlet air to be heated, represented by arrow E, flows, for example, by the building forced air system or convection through an opening 66 in wall 60 of the device and over the fins 64 to be heated. The air then flows through vertical fins 71 on the scrubber water cooling coils 71A. The air shown by arrow E, then flows upwardly through conduits 72 and out conduits 72 through a plenum chamber 76 and an outlet 77 to a space to be heated. In this regard it should be noted that if there is ever a crack in the vertical heat exchanger the unit is fail safe. That is, air will flow from the inside of the heat exchanger into the combustion chamber and act as an additional source of combustion air due to the suction induced draft and thereby eliminates danger of carbon monoxide leakage to the space to be heated.

Within the scope of the present invention the combustion gasses emitted from venturi 36, as previously stated, pass downwardly as shown by arrow B through the annular plenum 54 through the gas scrubber nozzles assemblies 89 to conduit 62, while transferring heat to the conduits 72 and through the outlet 77 to the space to be heated.

The gasses B generally include the noxious materials such as Sulfur Oxides and Nitrous Oxides and within the scope of the present invention are scrubbed, as described hereinafter. Scrubbing is accomplished by mixing the gas with liquid, such as water and Desulfurization Aids and Neutralzers, as described hereinafter. The gasses, liquid and vapor pass through the fin section 64 to transfer heat to the incoming air to be heated and to a reservoir 107 shown in chamber 25. The characteristics of the materials in the liquid 107 in chamber 25 can be adjusted by means of a makeup tank 111 which communicates with the reservoir 107 by means of a conduit 112 to introduce additional active materials into the liquid 107.

As previously stated, baffle 26 is provided to prevent entrainment of liquid into gasses which have been scrubbed and are emitted through inlet 23 to blower 22 for return to the combustion system and/or to the exhaust outlet 84.

The liquid is withdrawn, for recirculation, through inlet 106 to pump 104 which then circulates the liquid to filter 103 for supply to coil 71A which includes vertical fins 71 to transfer heat from the liquid to the air stream supplied to the conduits 72. It is to be understood that within the scope of the present invention dual filters 103 can be provided so that one filter can be changed and cleaned while the other is in use to avoid shut downs for cleaning the filter devices.

In addition, a control system is provided including a microprocessor 96 which is utilized to operate various aspects of the device including the damper 25, as shown. Microprocessor 96 is also connected by means of a lead 94 to a Nitrous Oxide analyzer 93 which receives a sample of exhaust gas from a probe 92 to determine $NO_x$ concentration as indicative of the combustion characteristics. A second valve 91 is connected to the source of combustion fuel 40 and operated by the microprocessor 96 in response to the temperature sensed by a probe 101 and transmitted to the microprocessor by means of a lead 102. Microprocessor 96 also operates the pump 104 and the drive 7 for the auger 6 as shown.

In operation, the system is started with the blower 22 initially operated so that outside air enters the inlet 81 by aspiration and the source of fuel 40 is activated to provide a combustion mixture at the inlet 21 to the apertures 17 and 48A so that combustion can be started at the outlet 35 of the combustion device. Ignition can be accomplished by any convenient means which are not shown in the accompanying drawings.

When the temperature probe 101 reaches a preselected temperature microprocessor 96 initiates the operation of drive 7 so that solid fuel feed commences and the slurry liquid pump 104 commences operation. Subsequently, the start-up fuel supply 40 is terminated and the system operates on the solid fuel. As the fuel rod burns, the combustion gasses enter the venturi 36 where the velocity increases and the pressure decreases. As the burning particles rise from the venturi throat the pressure increases as gas velocity decreases and the particulate matter C flows downwardly through the annular chamber 47 as previously described. The particles are recycled as shown by arrow D through the burning chamber until the weight has decreased to the point where the terminal velocity permits carry over, as shown by arrow B, into the annular chamber 54 along with the completely burned combustion gasses. During this period heat transfer occurs to the tubes 72 to provide heated air at outlet 77, as previously described. The particulate matter represented by the arrows D strikes any portion of the fuel rod 31A which may have been emitted from the die 30 and causes erosion at the surface breaking off additional burning particles to maintain control of the burning. Gasses B emitted over the baffle 46 pass downwardly through scrubber nozzle assemblies 89 and tubes 62 to the reservoir 107, where the solid particles are entrained in the liquid and then pass to the filter 103 for removal. The air is then recycled by means of inlet 24 through blower 22 to conduits 21 and 84 where the damper 25 regulates the proportion of the makeup air supplied to the combustion system.

To scrub the gas flowing downwardly in chamber 54 nozzle assemblies 89, shown in FIGS. 3, 4 and 5, are provided to provide initial scrubbing of the burned gas so that the material passing downwardly through conduit 62 can also include liquid which is returned to the reservoir 107. The liquid is supplied to the nozzle assemblies 89 from the coil 71A, as shown, where the assembly 89 includes a ring 87, as shown, having nipples 88 with diametrically directed apertures 88B which spray the liquid out in spray H, as shown in FIG. 5, to contact solid segments 90A of a ring assembly 89. Openings 90 are provided between the segments 90A for admission of the gas G flowing downwardly in chamber 54 to the scrubbing area and to provide the necessary contact between the gas and the liquid for removal of the particulate matter and reaction of Nitrous and Sulfurous Oxides prior to return to the reservoir 107. The operation of the scrubber is such that upon reaching the nozzle assemblies 89 the gas is at its maximum pressure and therefore lowest velocity. The gas G flows into the outer sleeve through the apertures 90 where the gas is contacted by the sprays H emitted from the nozzles 88. In some instances the liquid, or portion thereof is heated to vaporization to form vapor and the gas, steam vapor and liquid mixture flows through the sleeve. The liquid mixture then transfers the heat to the fins 64 connected to the conduit 62 as shown in FIG. 1. Control is achieved through the reservoir 107 when the blower 22 is an induction blower so that as far as the combustion portion of the arrangement is concerned, the combustion air pressure is determined by the height of the liquid 107 in the chamber 25. In an alternative arrangement shown in FIG. 6 conduit 62 is cut off above the surface 101 of the liquid in the reservoir.

The fluid I from conduit 62 passes into sleeve 115 and impinges on the surface 101. Sleeve 115 is connected to conduit 62 by means of a bellows seal 114 connected at one end to conduit 62 by a clamp 106 and at the other end to sleeve 115 by clamp 117.

A float 118 can be located on the bottom side of flange 113 to provide a bouyant force to position the sleeve 115 relative to surface 101 of the liquid. The depth of the float 118 in the liquid below surface 101 is determined by a weight 119, which surrounds sleeve 115 and urges the assembly downwardly against the bouyant force exerted by float 118. Thus float 118 is always in the liquid and forms a gas weir so that the gas streams must enter the liquid to be scrubbed and pass around float 118 but since float 118 is always the same depth below the surface 101 of the liquid the pressure characteristics in the system do not change with a charge in level of the liquid.

$NO_x$ analyzer 92 is provided to determine the Nitrous Oxide content in the combustion gas emitted from conduit 84. The rate of Nitrous Oxide formation is retarded when the combustion temperature is maintained at or below certain levels. In the arrangement shown the $NO_x$ is optimized by the precise burning of small amounts of fuel at precise rates and temperatures. This is accomplished by means of the dampers 25, 25A which operate in response to the NO$_x$ concentration in the gas emitted from the system. Control is maintained by monitoring the temperature of the gas emitted from venturi 36 by means of probe 101. When the temperature reaches a preselected value, and the NO$_x$ sensor 92 reaches a preselected value, the controller 96 causes adjustment of the damper 25, 25A to decrease the oxygen concentration in the combustion gas, a selected amount by closing damper 25 and opening damper 25A. Likewise when the values are shifted then additional oxygen may be admitted to the combustion device by adjusting the flow control dampers in the opposite direction.

Accordingly, uniform combustion temperatures can be maintained in the system despite the different heat values of the wood and coal and uneven blending or burning of the various fuels while maintaining the requisite air flow volume for the proper operation of the fluidized bed. The controller 96 can further adjust the feed of motor 7 to adjust the rate of speed of the fuel to the burner to maintain optimum equilibrium conditions.

It is to be understood that the foregoing is but one example of an arrangement within the scope of the present invention and that various other arrangements also within the scope of the present invention will occur to those skilled in the art upon reading the disclosure set forth hereinbefore.

The invention claimed is:

1. A fuel burning device including fuel compression means to receive solid fuel and compress said solid fuel; die means to receive said compressed fuel from said compression means and form said compressed fuel into a selected shape fuel; burner casing means having an inlet to receive said selected shape fuel where said combustion chamber has a mean diameter greater than the diameter of said selected shape fuel whereby at least a portion of said selected shape fuel is exposed to an annular combustion chamber formed between said fuel shape and said burner casing; air supply means to supply air to said annular combustion chamber; second annular casing means disposed outwardly from said burner casing to form a second annular space therebetween; second air supply means to supply air to said second annular chamber; flow restricter means located adjacent the outlet of said burner casing whereby combustion gasses generated by combustion of said fuel shape flow through said restriction means at reduced pressure and increased velocity relative to the pressure of said supply air; first heat coil means located at said outlet of said restriction means whereby heat is transferred to said heat coil means from said combustion gasses emitted from said restriction and wherein said heat exchanger includes coil means having selected separation between adjacent coils whereby combustion gasses flow therebetween; generally tubular recycle casing means located outside said second annular casing to define annular recycle conduit therebetween whereby particulate matter emitted through the said openings between adjacent coils of said heat exchange means flow downwardly through said annular recycle conduit to be admitted to be recycled by said second air supply means through said first annular area; tubular return casing means located outside said recycle casing means forming an annular area therebetween whereby gasses emitted from between the coils of said heat exchanger flow downwardly therethrough; scrubber means to receive gasses flowing through said annular means for removal of noxious material therefrom; and duct means including inlet means to receive air to be heated and outlet means to emit heated air extending upwardly through said first return annular area and said recycle area to receive heat from gasses said recycled gasses and said return exhaust gasses flowing therethrough.

2. The invention of claim 1 wherein a portion of said exhaust gas is recycled to supply combustion gas to said combustion chamber.

3. The invention of claim 2 including air means to supply fresh combustion to said air supply means whereby said fresh combustion air and recycled combustion air are mixed in selected proportions.

4. The invention of claim 3 including analyzer means to analyze the composition of said gas and to combine said exhaust gas and said fresh combustion air in a proportion depending upon the composition of said exhaust gas.

5. The invention of claim 4 wherein said combustion recycled exhaust gas and said fresh gas are combined in accordance with the proportion of oxygen in said exhaust gas to supply combustion gas having a selected oxygen content to control the rate of combustion of said fuel in said chamber.

6. The invention of claim 5 including temperature sensing means located at said outlet of said heat exchange means whereby said ratio of said oxygen concentration in air supplied to said air supply means is controlled in accordance with the temperature of said combustion gas emitted from said heat exchange device.

7. The invention of claim 1 including noxious gas analyzer means to analyze the relative proportion of noxious material in said exhaust gas; override means to modulate the flow of relative proportions of recycled exhaust gas and fresh combustion gas in response to the concentration of noxious material in said exhaust gas.

8. The invention of claim 1 wherein scrubber means are provided to remove noxious material from said exhaust gas including reservoir means, and pump means to introduce flow of said exhaust gas into the liquid of said reservoir means.

9. The invention of claim 8 including liquid pump means to pump said liquid through second heat exchanger means, including inlet means to receive air to be heated and pass said air over said second heat exchanger means to the inlet of said duct means whereby said air to be heated is preheated by heat gained from circulation of said liquid through said heat exchanger means.

10. The invention of claim 9 wherein said liquid means is sprayed into said exhaust gas prior to introduction of said exhaust gas into said reservoir means.

11. The invention of claim 10 wherein said sprayer means includes said nozzle means to receive said liquid and includes radially extending aperture means whereby said liquid is sprayed radially outwardly from said nozzle means, annular deflector means surrounding said nozzle means with deflector veins located in alignment with said aperture means whereby liquid emitted from said nozzle means by said deflector means and whereby recycle air flows through aperture means between said deflector means to supply contact between said gas and said liquid.

12. The invention of claim 11 wherein said outlet nozzle means for said exhaust gas include flexible boot means extending downwardly from said outlet nozzle means, float means located at the bottommost part of said boot means and connected thereto whereby said boot means floats on the surface of liquid in said reservoir.

* * * * *